Nov. 5, 1957  H. SINCLAIR  2,812,045
TOOTHED COUPLINGS
Original Filed Feb. 14, 1948  3 Sheets-Sheet 1
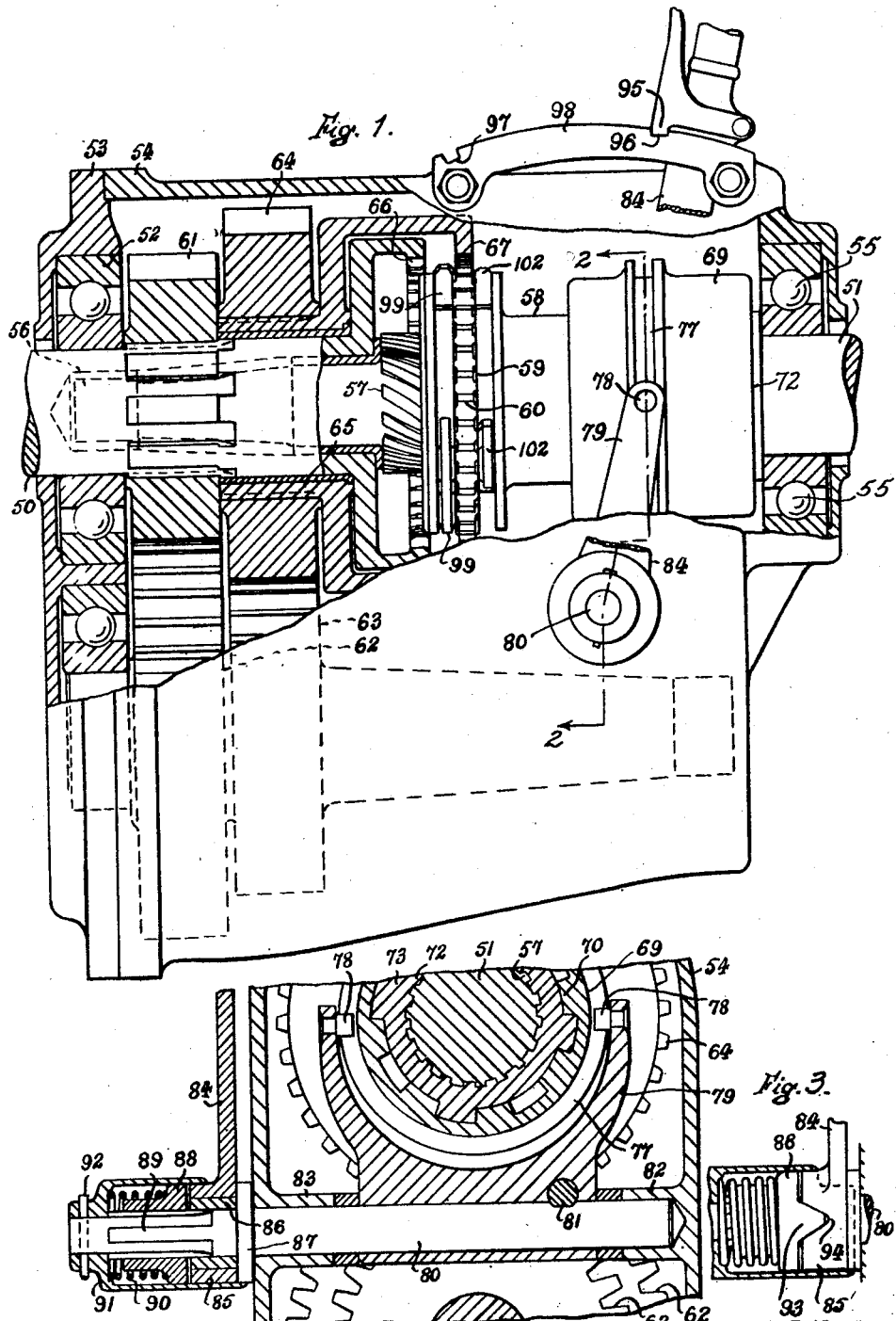
INVENTOR
Harold Sinclair
BY
Dean Fairbank & Hirsch
ATTORNEYS

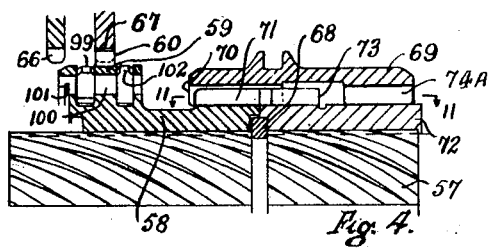

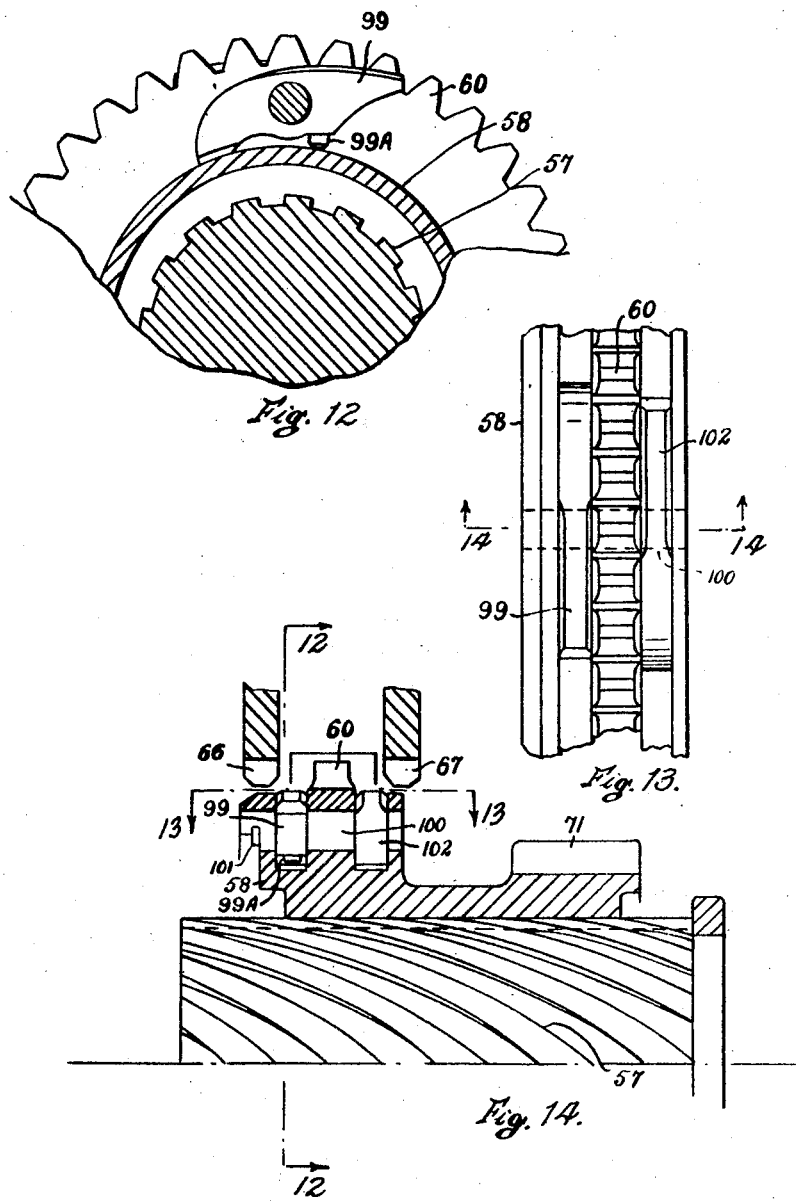

United States Patent Office 2,812,045
Patented Nov. 5, 1957

2,812,045
TOOTHED COUPLINGS

Harold Sinclair, Windsor, England

Continuation of application Serial No. 8,359, February 14, 1948. This application September 23, 1952, Serial No. 311,051

6 Claims. (Cl. 192—48)

This invention relates to toothed couplings for conveying or preventing rotary motion. This application is a continuation of my application Serial No. 8,359 filed February 14, 1948, now abandoned. The invention relates to toothed couplings of the kind including a toothed first member (which may be the driving member, or a driven member or a stop member), a second member (which may be the driven or stop member, or the driving member respectively) coaxial with the first member, an intermediate member so mounted on the second member as to be constrained to move helically with respect thereto in consequence of relative rotation between the intermediate and second members, the intermediate member having teeth engageable with the teeth on the first member, and locking means operable for preventing such helical movement in at least one direction and thereby maintaining the teeth so engaged. When the teeth are engaged, the intermediate member tends to move axially in one direction under torque load in one sense and to move axially in the other direction under torque load in the other sense.

Examples of couplings of this kind are described in my Patent No. 2,245,017 with reference to Figures 2 to 10 thereof. In these examples the locking means include a locking member which is coaxial with the first-mentioned three members and which is axially slidable between locking and unlocking positions.

An object of this invention is to provide an improved arrangement for initiating engagement of the teeth of a coupling of the kind specified.

Such couplings at present in use include a subsidiary ratchet drive adapted to couple together the first and intermediate members and so arranged as to engage the teeth of these two members together without clashing on relative angular displacement of the said two members in one sense; this ratchet drive includes a pawl displaceably mounted on the first member or on the intermediate member and co-operating with the teeth on the intermediate member or the first member respectively. In the normal operation of such a coupling synchronised by the subsidiary ratchet drive, the torque load transmitted by the ratchet drive is small, being no more than that required to displace the intermediate member with respect to the second member, since the arrangement is such that, during engagement together of the teeth on the intermediate and first members, the ratchet drive becomes inoperative before these teeth are fully engaged. Under certain circumstances, however, as for example when two such couplings are used as clutches or stops for selecting respectively two alternative ratios in change-speed gearing, abnormal conditions may arise, such as the involuntary reversal of the said two couplings of the change-speed gearing when the change-speed control means are in an unlocked condition, which may cause an unduly high torque to be applied to the subsidiary ratchet drives. A further object of this invention is to provide an improved arrangement which reduces or eliminates risk of damage due to such abnormal conditions.

Further objects and advantages of the invention will be apparent from the following description of a preferred embodiment thereof, given by way of example and with reference to the accompanying diagrammatic drawings, in which:

Figure 1 is a part-sectional side elevation of a change-speed gearing having a double coupling in accordance with the invention and operating as a ratio-selecting clutch, Figure 2 is a section on the line 2—2 in Figure 1, Figure 3 is a view corresponding to a part of Figure 2, but showing certain elements in elevation instead of in section, Figure 4 is a section of part of the double coupling appearing in Figure 1, locked in the low-speed condition, Figure 5 is a developed section on the line 5—5 in Figure 4, Figure 6 corresponds to Figure 4, but showing the coupling during the change from the lower- to the higher-speed condition, Figure 7 is a developed section on the line 7—7 in Figure 6, Figure 8 corresponds to Figure 4, but shows the coupling locked in the high-speed condition, Figure 9 is a developed section on the line 9—9 in Figure 8, Figure 10 corresponds to Figure 4, but shows the coupling during the change from the higher- to the lower-speed condition, Figure 11 is a developed section on the line 11—11 in Figure 10, Figure 12 is an end elevation of a part of the double coupling appearing in Figure 1, taken on the line 12—12 in Figure 14, Figure 13 is a developed plan of the parts appearing in Figure 12, as viewed on the line 13—13 in Figure 14, and Figure 14 is a section on the line 14—14 in Figure 13.

The double coupling referred to as a preferred embodiment is constituted by two toothed couplings of the kind hereinbefore specified, which serve as clutches for selecting respectively two alternative ratios, and which have common control means, a common second member, a common intermediate member capable of moving axially from a first position in which its teeth are in mesh with the teeth of the first member of one of said couplings, through a range of positions in which its teeth are not in mesh with other teeth, into a second position in which its teeth are in mesh with the teeth of the first member of the other of said couplings, and locking means operable by the control means for preventing movement of the intermediate member out of the first and second positions, the arrangement being such that, when the common intermediate member is in at least the majority of the positions in said range, the couplings permit relative rotation of the two said first members in both directions, and the control means are operable for urging the intermediate member resiliently in said range of positions into cooperation alternatively with the one and the other of the first members. The locking means comprise a common locking member having a limited amount of motion in the unlocking position and so arranged that initial movement of the locking member in two directions from the unlocking position serves to bring the intermediate member into cooperation with the one and the other of the first members respectively.

The locking means are of the kind disclosed in my said Patent 2,245,017 with reference to Fig. 2 thereof, and thus include a splined locking sleeve which cooperates with splines on the intermediate member and on the second member, and which can be shifted axially for the purpose of disengaging its splines from and engaging its splines with the splines on one of the intermediate and second members and thereby selectively permitting and preventing relative rotation, in at least one direction, between the intermediate and second members when the teeth of a first member and of the intermediate member are fully meshed together. The ends of some of the disengageable locking splines are so bevelled that an axial force applied to the locking sleeve when the coupling is disengaged causes the bevelled ends of the locking splines to cooperate with others of the locking splines in such a manner as to impart to the intermediate member a rotation on the second member in such a direction as to displace the intermediate member axially into cooperation with the first member.

If the couplings are not provided with a subsidiary ratchet drive, the above-mentioned cooperation of the intermediate member with a first member is a nuzzling contact of the coupling teeth. In this case, before the speeds of a first member and the second member have been synchronized, the nuzzling contact of the teeth tends to displace the intermediate member helically with respect to the second member in such a direction as to disengage the teeth. However, as soon as the direction of relative rotation of the first and second members begins to change, the locking means are able to initiate the meshing engagement of the teeth and thereafter the helical movement of the intermediate member fully engages the teeth.

The subsidiary ratchet drive may be omitted from the improved coupling in circumstances where it is permissible to risk failure of the jaw-clutch teeth to engage cleanly, in the rare event that their noses meet corner to corner. In the present embodiment, however, it is preferred to retain the subsidiary ratchet drive, and in this case the above-mentioned cooperation of the intermediate member with a first member is the cooperation of the pawl of the subsidiary ratchet drive, which is mounted on one of the intermediate and first members, with the teeth on the other of these members.

The gearing shown in the drawings has a driving shaft 50 coaxial with a driven shaft 51 constituting the above-mentioned second member. The shaft 50 is carried in a bearing 52 housed in an end cover 53 of a gear case 54. The shaft 51 is carried in a bearing 55 in the gear case and is piloted at 56 in the shaft 50.

The driven shaft 51 has a part provided with right-handed helical splines 57 on which a sleeve-shaped nut 58 is constrained to move helically; this nut is the intermediate member and is provided near its front end with a radial flange 59 edged with a ring of jaw-clutch teeth 60. The driving shaft 50 drives through a speed-reducing gear train 61, 62, 63, 64, a hollow shaft 65 which surrounds a part of the driving shaft and to which the gear wheel 64 is splined. The driving shaft 50 and the hollow shaft 65 have respectively at their rear ends rings of inwardly projecting jaw-clutch teeth 66 and 67 capable of meshing with the teeth 60 on the nut 58. The helical movement of the nut is limited by the driving shaft 50 and a two-part stop ring 68 located in gaps in the splines 57 so that, when the nut is in its foremost and rearmost positions, its teeth 60 are fully engaged with the higher- and lower-speed teeth 66 and 67 respectively. When the nut is in the middle position, its ring of teeth is between and out of mesh with the two rings of teeth 66 and 67.

The locking means, which are of the kind disclosed in my said patent specification No. 2,245,017 with reference to Figure 2 thereof, include a locking sleeve 69 having internal straight splines 70 (Figures 4 and 5) in its front part slidably engaged with external splines 71 on the rear part of the nut 58. A bushing 72 which has internal helical splines engaged with the splines 57 and which is thereby made rigid with the driven shaft 51 has straight splines 73 so disposed that the splines 70 in the locking sleeve can be meshed with the driven-shaft splines 73 only when the nut is in its rearmost position, i. e. the lower-speed gear position. Within the rear end of the locking sleeve 69 are alternate long and short straight splines 74A and 74B which can be meshed with the driven-shaft locking splines 73 only when the nut is in its foremost position corresponding to engagement of the higher-speed gear.

The normal direction of rotation of the shafts is clockwise as viewed from the front of the gearing. The front and rear end faces of the driven-shaft locking splines 73 are bevelled as right-handed helices 75 and 76 over part of their width.

The locking sleeve 69 has a circumferential groove 77 engaged by pins 78 on a striking yoke 79 which is fixed to a transverse shaft 80 by a cotter pin 81. The shaft 80 is carried by bearings 82 and 83 in the gear case 54 and in turn carries a preselector mechanism. A gear-shift control lever 84 has a hub 85 rotatable on a bush 86 on the shaft 80. A flange 87 on this shaft forms a thrust bearing for the hub 85. An internally splined dog 88 is engaged with a splined part 89 of the shaft 80, and a helical spring 90 urges the dog 88 towards the hub 85 while reacting on a cap 91 locked to the shaft 80 by a pin 92. Two diametrically opposed V-shaped camming projections, such as 93 (Figure 3), on the dog 88 cooperate with camming grooves, such as 94, of complementary shape in the hub 85. Thus, when the lever 84 is moved in either direction and resistance to shifting of the locking sleeve 69 prevents the shaft 80 from following the displacement of the lever 84, the camming projections 93 ride up the sides of the grooves 94 and thereby further compress the spring 90, so that the shifting yoke 79 urges the locking sleeve to move axially. The gear-shift lever 84 has a latch 95 (Figure 1) engageable in a low-speed notch 96 and a high-speed notch 97 in a quadrant 98 fixed to the gear case 54.

Meshing of the teeth 60 of the nut member 58 with the teeth 66 of the shaft member 50 is initiated by a set of pawls which may be mounted on either of these members for co-operation with the teeth of the other. Likewise meshing of the teeth of the member 58 with the teeth 67 of the shaft member 65 is initiated by a second set of pawls which may be mounted on either of these members for co-operation with the teeth of the other.

In the present example the nut 58 is provided with a set of three uniformly spaced pawls 99 (Figures 12, 13 and 14) mounted in front of the flange 59 on pins 100 locked by a snap ring 101. The noses of these pawls point clockwise as viewed from the front (i. e. the left-hand side of Figure 1), and each projects very slightly beyond the flank of the nearest tooth 60. The pawl noses are urged radially outwards by spring-loaded plungers such as 99A. The second set of three spring-biased pawls 102 is mounted on the pins 100 behind the flange 59, their noses pointing in the counterclockwise direction as viewed from the front and projecting very slightly behind the flanks of the adjacent teeth 60. As is evident from Figure 14 when the nut 58 is in its middle position, the pawls 99 are behind the ring of teeth 66 and the pawls 102 are in front of the ring of teeth 67, so that the nut is completely disengaged from the teeth 66 and 67, irrespective of the direction of relative rotation of the nut and the teeth 66 or 67. There is therefore no risk of overloading of the pawls in the event of accidental reversal of rotation of the couplings when the nut is in its mid position.

The operation of this double coupling will be explained by assuming first that the gearing is running with the lower-speed gear engaged. The nut 58 will thus be in its rearmost position, and the locking sleeve 69 will also be in its rearmost position, with its splines 70 engaged between the driven-shaft splines 73. The parts are thus in the positions in which they appear in Figures 1, 2, 3, 4 and 5. The clearances are such that, so long as the gearing is transmitting driving torque, the nut is hard against its rear stop 68 and the locking sleeve carries no torque, there being a small clearance between the flanks of each spline 73 and the adjacent two splines 70. The higher-speed jaw-clutch teeth 66 will now be rotating forwards faster than the engaged jaw-clutch teeth 60 and 67.

In order to change to the higher-speed gear the shift lever 84 is moved to and latched in notch 97, and the locking sleeve 69 is thereby urged forwards; it moves forwards immediately so far that the front ends of its splines 74A abut against the oblique rear faces 76 of the driven-shaft locking splines 73. The nut teeth 60 are at first retained in mesh with the lower-speed shaft teeth 67 by the driving torque. Thereafter the driving shaft 50 is retarded while the rotation of the driven shaft 51 is maintained by the inertia of the mechanism driven by the gearing. The retardation of the lower-speed shaft teeth 67, relative to the driven shaft 51, cause the nut to move helically forwards on the driven shaft until its teeth 60 disengage from the lower-speed shaft teeth 67, whereupon the leading front corners of the splines 74A on the locking sleeve co-operate with the oblique rear end faces 76 of the driven-shaft locking splines 73, and the reaction at these oblique faces causes the locking sleeve 69 to be rotated counter-clockwise, as viewed from the front, and the counter-clockwise rotation thereby imparted to the nut 58 moves it forwards until its pawls 99 come into the path of the higher-speed shaft teeth 66 and its teeth 60 nuzzle the teeth 66. At first the latter teeth are rotating forwards faster than the nut teeth 60, so that any rotation imparted to the nut by the higher-speed shaft teeth 66 will tend to move the nut helically rearwards. However, when the speed of the higher-speed shaft begins to drop below that of the driven shaft, the nut teeth 60 are fed by the action on the nut 58 of the helical splines 57 under the influence of the torque applied to the nut by the pawls 99, assisted by the action of the oblique rear end faces 76 of the driven-shaft locking splines 73, into partial mesh with the higher-speed shaft teeth 66, the relative rotation of the driven shaft and the driving shaft then causing these teeth to be drawn fully into mesh with each other. As they become fully meshed, the splines 74A in the locking sleeve slip round the rear corners of the driven-shaft locking splines 73 and the preselector mechanism causes the locking sleeve to complete its forward movement, bringing the parts into the configuration shown in Figures 8 and 9. During torque is now re-applied to the shaft 50 and since the locking sleeve 69 locks the nut 52 on the driven shaft 51, the latter is driven in the higher-speed (direct drive) ratio.

In order to change to the lower-speed ratio, first the shift lever is latched in notch 96 and the locking sleeve 69 is thereby urged to the rear by the preselector control mechanism, but it is prevented from moving by the friction due to the driving torque load on its splines. The driving torque is now momentarily interrupted, so that the locking sleeve moves sharply rearwards until it is arrested by the abutting of the rear ends of its splines 70 against the driven-shaft splines 73. The driving shaft now accelerates, the higher-speed teeth 66 operating to move the nut helically rearwards until the nut teeth 60 disengage from the shaft teeth 66 (Figures 10 and 11). Now the trailing rear corners of the splines 70 on the locking sleeve co-operate with the oblique front end faces 75 of the driven-shaft locking splines 73, and the reaction at these oblique faces causes the locking sleeve to be rotated clockwise, as viewed from the front, and the clockwise rotation thereby imparted to the nut moves it rearwards until the pawls 102 come into the path of the teeth 67, and the rearward ends of the splines 70 pass off the oblique face 75 into cutting engagement with the face 75A. As soon as the speed of the teeth 67 begins to exceed that of the driven shaft, the nut teeth are fed, by the action on the nut 58 of the helical splines 57 under the influence of the torque applied to the nut by the pawls 102, into partial mesh with the lower-speed shaft teeth 67, the relative rotation of the driven shaft and the lower-speed shaft causing the teeth to be drawn fully into mesh, whereupon the locking-sleeve splines 70 slip round the front corners of the driven-shaft splines 73.

The front end faces 75 of the driven-shaft locking splines 73 are bevelled only over that part of their width traversed by the corners of the locking-sleeve splines 73 in bringing the pawls 102 into the path of the coupling teeth 67. The remainder of these end faces is square with the flanks of the splines. In this way an adequate flank bearing area can be provided on the splines without making them excessively long. The rear end faces 76 may be similarly shaped to 75, 75A.

When it is important to make the mechanism as short as possible, the rings of teeth 66 and 67 may be placed closer together, and the total travel of the nut correspondingly shortened, the arrangement being such that when either of the sets of pawls 99 and 102 is fully in register with the ring of teeth 66 and 67 respectively, the other of the sets of pawls is completely disengaged from the ring of teeth 67 or 66 respectively, but that, when the nut is passing through a relatively small fraction of its total range of travel midway between its end positions, both sets of pawls 99 and 102 will for an instant partly register with the paths of the teeth 66 and 67 respectively. Nevertheless the risk that accidental reversal of rotation of the gearing will cause pawls of both sets to be simultaneously engaged by teeth at this particular instant is so remote that it can often be tolerated.

The distinction between the present invention and arrangements of such double couplings at present in use will be clear from the following considerations. If the coupling shown in Figs. 1 and 14 were of the known type, the axial spacing of the teeth 66 and 67 would be so reduced that, when the nut 58 was being moved axially in either direction, before the nut teeth 60 became fully disengaged from the teeth 66 or 67, the pawls 102 or 99 would have come into the path of the teeth 67 or 66 respectively. There would therefore have been no possibility of the nut's getting into a position such that one set of pawls was overrunning and the other was inoperative, or such that both sets of pawls were inoperative, and that consequently the nut would fail to complete its automatic gear shifting movement. However, if while the nut teeth were partly or completely disengaged, the driving shaft were accidentally rotated backwards, owing to the reversal of the direction of relative rotation of the teeth 66 and 67, the operative set or sets of pawls would engage and become subjected to the full effect of the torque on the gearing, which would probably break them. When the teeth 66 and 67 have a wider axial spacing, as shown in the accompanying drawings, backward rotation of the driving shaft 50 while the nut 58 is in an intermediate position cannot cause a pawl to become jammed under the applied torque. Nevertheless, the novel action of the locking mechanism avoids a condition such that the nut will not shift axially when the driving shaft 50 is again rotated forwards.

It will be seen from the foregoing that by means of the invention a member which has hitherto been used for locking purposes can also be used as the means for axially shifting the intermediate member in the range in which the pawl drive is inoperative. The use of the locking sleeve to effect the required shifting does not interfere with its locking function. Moreover, no further parts need be added to the coupling, all that is necessary being the provision of bevels on the ends of splines that are already present, so that an axial movement of the locking sleeve from its inoperative position results in an angular movement of the intermediate member and this angular movement is converted into an axial movement of the intermediate member due to the fact that the intermediate member is constrained to move helically.

With an arrangement according to the invention, it is easily possible to obtain a multiplication or reduction of the axial movement of the intermediate member as compared with the axial movement of the locking sleeve. In the case illustrated the inclination of the bevels 75, 76 is such, having regard to the pitch of the helical splines 57, that a given axial movement of the locking sleeve 69 results in a greater axial movement of the intermediate member 58. These movements may for example be a quarter inch and a half inch respectively, so that a mechanical multiplication of 2 is obtained. This feature is of particular advantage is designing a gear of very compact form, for example for use in automobiles, since many of the clearances in the gear are interdependent and a decrease in one clearance can cause a simultaneous decrease in several others. There may be other reasons why a mechanical multiplication is required in particular circumstances, and in some cases it may even be desirable to obtain a mechanical reduction by suitably relating the angles of the splines and the bevels so that a given axial movement of the locking sleeve produces a smaller axial movement of the intermediate member and a mechanical advantage is obtained.

I claim:

1. A toothed coupling including a first member, a second member coaxial with the first member, first splines fixed relatively to said second member, an intermediate member so mounted on the second member as to be movable helically with respect thereto between two positions, in consequence of relative rotation between the intermediate and second members, projections on said first and intermediate members, second splines on said intermediate member, said projections on the intermediate member in one of said positions engaging with projections on the first member and in the other of said positions being out of engagement with said projections on the first member, locking means including a splined locking sleeve the splines of which cooperate with said first and second splines and which can be shifted axially to selectively permit and prevent relative rotation, in at least one direction, between the intermediate and second members when the coupling is in the coupled condition, and acting as the means for shifting said intermediate member over at least part of the travel between said two positions, bevels upon the ends of at least some of said splines cooperating with others of said splines, whereby appropriate axial movement of the locking sleeve imparts to the intermediate member a rotation, and in consequence of said rotation, a displacement in the axial direction.

2. Two toothed couplings for use as clutches for selecting respectively two alternative gear ratios in a change-speed gearing, each of said couplings including a first member and projections on said first member, and said couplings including a common second member coaxial with the first members of the said two couplings, a common intermediate member so mounted on said second member as to be movable helically with respect thereto, in consequence of relative rotation between the intermediate and second members, projections on the intermediate member engageable alternatively with said projections on said two first members, the intermediate member being movable through a range of positions in which its projections are out of engagement with said projections on said two first members, the said range being between two positions in which at least one of its projections is engaged respectively with a projection on said two first members, at least over the greater part of said range the couplings permitting relative rotation of said two first members in both directions, locking means including a splined locking sleeve the splines of which cooperate with splines on the intermediate member and with splines fixed relatively to said second member to maintain the desired one of the couplings in the coupled condition and which can be shifted axially to permit said helical movement of said intermediate member, and acting as the means for shifting said intermediate member over at least part of said range, bevels upon the ends of at least some of said splines cooperating with others of said splines, whereby appropriate axial movement of the locking sleeve imparts to the intermediate member rotation in either direction, and in consequence of such rotation, axial displacement in either direction.

3. A toothed coupling including a first member, a second member coaxial with the first member, first splines fixed relatively to said second member, an intermediate member so mounted on the second member as to be movable helically with respect thereto between two positions, in consequence of relative rotation between the intermediate and second members, projections on said first and intermediate members, second splines on said intermediate member, said projections on the intermediate member in one of said positions engaging with projections on the first member and in the other of said positions being out of engagement with said projections on the first member, locking means including a splined locking sleeve the splines of which cooperate with said first and second splines and which can be shifted axially to selectively permit and prevent relative rotation, in at least one direction, between the intermediate and second members when the coupling is in the coupled condition, and acting as the means for shifting said intermediate member over at least part of the travel between said two positions, bevels upon the ends of at least some of said splines cooperating with others of said splines, whereby appropriate axial movement of said locking sleeve imparts to the intermediate member a rotation and, in consequence of said rotation, a displacement in the axial direction, the inclination of said bevels being such that a given axial movement of said locking sleeve results in an axial movement of different extent of said intermediate member.

4. Two toothed couplings for use as clutches for selecting respectively two alternative gear ratios in a change-speed gearing, each of said couplings including a first member and projections on said first member, and said couplings including a common second member coaxial with the first members of the said two couplings, a common intermediate member so mounted on said second member as to be movable helically with respect thereto, in consequence of relative rotation between the intermediate and second members, projections on the intermediate member engageable alternatively with said projections on said two first members, the intermediate member being movable, through a range of positions in which its projections are out of engagement with said projections on said two first members, the said range being between two positions in which at least one of its projections is engaged respectively with a projection on said two first members, at least over the greater part of said range the couplings permitting relative rotation of said two first members in both directions, locking means including a splined locking sleeve the splines of which cooperate with splines on the intermediate member and with splines fixed relatively to said second member to maintain the desired one of the couplings in the coupled condition and which can be shifted axially to permit said helical movement of said intermediate member and acting as the means for shifting said intermediate member over at least part of said range, bevels upon the ends of at least some of said splines cooperating with others of said splines, whereby appropriate axial movement of said locking sleeve imparts to said intermediate member a rotation in either direction and, in consequence of such rotation, axial displacement in either direction, the inclination of said bevels being such that a given axial movement of said locking sleeve results in an axial movement of different extent of said intermediate member.

5. A toothed coupling including a first member, a second member coaxial with the first member, first splines fixed relatively to said second member, an intermediate member so mounted on the second member as to be movable helically with respect thereto between two positions, in consequence of relative rotation between the intermediate and second members, projections on said first and intermediate members, second splines on said intermediate member, said projections on the intermediate member in one of said positions engaging with projections on the first member and in the other of said positions being out of engagement with said projections on the first member, locking means including a splined locking sleeve the splines of which cooperate with said first and second splines and which can be shifted axially to selectively permit and prevent relative rotation, in at least one direction, between the intermediate and second members when the coupling is in the coupled condition, and acting as the means for shifting said intermediate member over at least part of the travel between said two positions, bevels upon the ends of at least some of said splines cooperating with others of said splines, whereby appropriate axial movement of said locking sleeve imparts to the intermediate member a rotation and, in consequence of said rotation, a displacement in the axial direction, the inclination of said bevels being such that a given axial movement of said locking sleeve results in an axial movement of greater extent of said intermediate member.

6. Two toothed couplings for use as clutches for selecting respectively two alternative gear ratios in a change-speed gearing, each of said couplings including a first member and projections on said first member, and said couplings including a common second member coaxial with the first members of the said two couplings, a common intermediate member so mounted on said second member as to be movable helically with respect thereto, in consequence of relative rotation between the intermediate and second members, projections on the intermediate member engageable alternatively with said projections on said two first members, the intermediate member being movable, through a range of positions in which its projections are out of engagement with said projections on said two first members, the said range being between two positions in which at least one of its projections is engaged respectively with a projection on said two first members, at least over the greater part of said range the couplings permitting relative rotation of said two first members in both directions, locking means including a splined locking sleeve the splines of which cooperate with splines on the intermediate member and with splines fixed relatively to said second member to maintain the desired one of the couplings in the coupled condition and which can be shifted axially to permit said helical movement of said intermediate member and acting as the means for shifting said intermediate member over at least part of said range, bevels upon the ends of at least some of said splines cooperating with others of said splines, whereby appropriate axial movement of said locking sleeve imparts to said intermediate member a rotation in either direction and, in consequence of such rotation, axial displacement in either direction, the inclination of said bevels being such that a given axial movement of said locking sleeve results in an axial movement of greater extent of said intermediate member.

References Cited in the file of this patent

UNITED STATES PATENTS

| 2,202,271 | Sinclair et al. | May 28, 1940 |
| 2,224,322 | Sinclair | Dec. 10, 1940 |
| 2,259,527 | Manville | Oct. 21, 1941 |
| 2,353,137 | Banker | July 11, 1944 |